United States Patent [19]

Setsuie et al.

[11] 4,368,227

[45] Jan. 11, 1983

[54] SUEDE-LIKE SHEET MATERIALS OF ULTRAFINE FIBERS

[75] Inventors: Takashi Setsuie; Koji Mimura, both of Otake; Kiyonobu Okamura, Hiroshima, all of Japan

[73] Assignee: Mitsubishi Rayon Company, Limited, Tokyo, Japan

[21] Appl. No.: 137,431

[22] Filed: Apr. 4, 1980

Related U.S. Application Data

[60] Continuation of Ser. No. 931,516, Aug. 7, 1978, abandoned, which is a division of Ser. No. 813,354, Jul. 6, 1977, Pat. No. 4,147,574.

[30] Foreign Application Priority Data

Jul. 12, 1976 [JP] Japan .................................. 51-82660

[51] Int. Cl.$^3$ ............................................. B32B 33/00
[52] U.S. Cl. ...................................... 428/91; 428/220; 428/233; 428/234; 428/253; 428/903
[58] Field of Search ................. 428/91, 233, 234, 253, 428/903, 220

[56] References Cited

U.S. PATENT DOCUMENTS

| | | | |
|---|---|---|---|
| 3,801,396 | 4/1974 | Steenhoudt | 156/62.2 |
| 4,042,740 | 8/1977 | Krueger | 428/138 |
| 4,146,663 | 3/1979 | Ikeda | 428/96 |

Primary Examiner—Marion McCamish
Attorney, Agent, or Firm—Oblon, Fisher, Spivak, McClelland & Maier

[57] ABSTRACT

A suede-like sheet material characterized by being formed of a base cloth and ultrafine fibers of a denier less than 0.5 per filament, said ultrafine fibers being entangled with each other and covering at least one surface of the base cloth, wherein a portion of said ultrafine fibers is stuffed into the gaps in the network of the base cloth, at least a portion of said ultrafine fibers being entangled with the component fibers of the base cloth, and said base cloth and ultrafine fibers being substantially integrated with each other.

12 Claims, No Drawings

SUEDE-LIKE SHEET MATERIALS OF ULTRAFINE FIBERS

This is a continuation of application Ser. No. 931,516 filed Aug. 7, 1978, now abandoned, which in turn is a division of Ser. No. 813,354, July 6, 1977, U.S. Pat. No. 4,147,574.

BACKGROUND OF THE INVENTION

1. Field of the Invention

The present invention relates to a sheet material having the same touch and drape characteristics as a natural suede and a method of producing the same.

2. Description of the Prior Art

Many synthetic suede-like sheet materials have already been suggested and a number of these materials are commercially available.

Generally speaking, the synthetic suedes or the process for producing these materials can be classified into the following five catefories: (1) a product made by buffing a fabric made of fibers of about 1 denier; (2) a product made by impregnating a nonwoven fabric made of fibers of more than 1 denier with an elastomer such as polyurethane and then buffing the product; (3) a product made by buffing a woven fabric formed from a composite of fibers or blended polymer fibers made of two or more incompatible polymers, wherein these fibers are used for the weft yarn in order to divide the weft yarn into ultrafine fibers of the individual polymer; (4) a product formed by impregnating a nonwoven fabric prepared from the composite fibers or polymer blended fibers of (3) above with an elastomer and then dissolving and removing one component of the composite fiber or blended polymer fibers thereby rendering the fibers very fine; and (5) a product made by mechanically or chemically treating a nonwoven fabric impregnated with the elastomer of part (4) above to divide the composite fibers or blended polymer fibers into individual polymer components thereby finely dividing the fibers. Among these classifications, the products formed from very fine or ultrafine fibers as described in parts (3) to (5), are closest in appearance, touch and hand to natural suedes. In all of these products, the very fine or ultrafine fiber bundle is considered as one unit. For example, sheets of products of classifications (4) and (5) are of a structure based upon ultrafine fiber bundles which are present in large amounts within the elastic polymer. As a result, when such products are buffed, a suede-like product is obtained. However, because the sheet characteristics are determined principally by the structure and character of the elastic polymer layer which is present in the sheet in large amounts, the products will be of a touch and drape substantially different than those of a natural suede. Therefore, a need continues to exist for a synthetic material which exhibits more suede-like characteristics.

SUMMARY OF THE INVENTION

Accordingly, one object of the present invention is to provide a sheet material having a touch and drape much more similar to the touch and drape of a natural suede than the touch and drape of conventional products and to provide a simple method of producing such a synthetic suede-like material.

Briefly, this object and other objects of the present invention as hereinafter will become more readily apparent can be attained by a suede-like sheet material which is formed of a base cloth and ultrafine fibers of 0.5 denier per filament, said ultrafine fibers being entangled with each other and covering at least one surface of the base cloth. A portion of the ultrafine fibers is stuffed into the gaps in the base cloth, and at least a portion of the ultrafine fibers is entangled with the component fibers of the base cloth. Moreover, the base cloth and ultrafine fibers form a substantially integral structure.

DESCRIPTION OF THE PREFERRED EMBODIMENTS

A knitted fabric, woven fabric or nonwoven fabric which has a stabilized structure is used for the base cloth for the formation of the sheet material of the present invention. From the viewpoint of such physical characteristics as strength and drape, a knitted fabric or woven fabric is preferred.

The physical characteristics of the sheet material of the present invention depend greatly on the base cloth and the ultrafine fibers not only contribute a substantial auxiliary effect, but also substantially improve the touch and hand of the sheet. Also, when an elastic polymer is used, the elastic polymer will function by enhancing the drape and strength characteristics of the base cloth as well as enhance the touch of the ultrafine fibers. In other words, the elastomeric polymer functions as a binder thereby strengthening the integrity of the base cloth combined with the ultrafine fibers thereby substantially improving the sheet characteristics.

In the sheet material of the present invention, the ultrafine fibers are integrated with the base cloth while covering at least one entire surface of the base cloth. Therefore, as described above, it is possible to separate the functions of the base cloth and ultrafine fibers. In other words, the physical properties of the sheet such as, for example, the strength, drape and cantilever bending length are substantially determined by the base cloth.

The weight ratio of the base cloth to the ultrafine fibers in the sheet of the present invention ranges from 1:4 to 4:1, more preferably 3:7 to 6:4. When a knitted fabric or woven fabric is used for the base cloth, the sheet of the present invention will usually have the following physical property values:

(1) Weight: 130 to 480 g/m$^2$
(2) Specific volume: 2.0 to 3.5 cm$^3$/g
(3) Tensile strength: 120 to 450 kg/cm/g/cm
(4) 45 degree cantilever bending length: 20 to 70 mm
(5) Thickness: 0.4 to 1.0 mm The specific volume characteristic can be determined from the following formula:

$$\text{Specific volume (cm}^3/\text{g)} = \frac{\text{Thickness (cm)}}{\text{Weight (g/cm}^3)}$$

The tensile strength and 45-degree cantilever bending length can be measured by the standard technique of JIS L-1079-1966. From the above characteristics, it is apparent that the sheet of the present invention has excellent physical values which are substantially indistinguishable from those of a conventional knitted fabric or woven fabric. If the elastic polymer is used in a weight amount of more than half the weight amount of the fibers used in a conventional artificial suede, a sheet having the desired physical property values will never be obtained. As explained above, the main objective of the elastic polymer component of the suede-like material is to strengthen the integrity of the base cloth and the ultrafine fibers or to stiffen the sheet so that the product has characteristics close to those of a natural suede. Therefore, the large amounts of the elastic polymer used in the manufacture of conventional sheets need not be used. If the elastic polymer is present in an amount less than 50% of the total weight of the base cloth and ultrafine fibers, preferably about 1 to 30% of these materials, a sufficient effect will be developed. The most important feature of the present invention is that by using a relatively small amount of an elastic polymer, or even in extreme cases, not using the elastic polymer at all, a synthetic suede-like material can be obtained which is very similar to natural suede material.

The base cloth used in the present invention may be any known knitted fabric, woven fabric or nonwoven fabric made of such known fibers as polyester fibers, polyamide fibers, polyolefin fibers, acrylic fibers, polyvinylalcohol fibers, polyvinyl chloride fibers, cellulose fibers and acetate fibers. The staples or filaments of the fibers should preferably be more than 0.6 denier. However, in order to maintain the physical property values of the obtained sheet material within the above mentioned ranges, to more strongly support the ultrafine fibers and to have the ultrafine fibers present on the sheet surface, it is preferable to use a base cloth formed of fibers having a latent shrinkability in order to shrink the integrated sheet. In such a case, it is desirable to use highly shrinkable fibers of a latent shrinkage which is defined as the length of shrinkage when the fibers are heat-treated for more than one minute at a temperature less than the temperature at which the fibers stick to each other, of more than 10%.

With shrinkage of the fibers, the integrity will be further strengthened and the various physical properties of the sheet will be improved. However, on the other hand, the problem exists that the hand will become so hard that the drape characteristic of the sheet may be impaired. In such cases, fibers having a latent spontaneous elongation ability as well as a shrinkability should be used as the base fibers of the base cloth. That is, if a sheet, once shrunk to strengthen the integrity of the sheet, somewhat spontaneously elongates thereby loosening somewhat, the softness and drape characteristics will be elevated while retaining the desired physial properties of the sheet.

Suitable highly shrinkable fibers which can be used in the present invention include acrylic fibers, polyamide fibers, polyolefin fibers and polyester fibers. Furthermore, fibers which also possess latent spontaneous elongation ability include, for example, polyethylene terephthalate fibers produced by a process disclosed in Japanese Patent Publication No. 7919/1962. It has been determined that fibers formed from this material when treated in warm water at 70° C., will shrink by 10 to 70%, preferably 30 to 60% and when the shrunken fibers are subsequently treated in boiling water at 100° C., even under no tension the shrunken fibers will elongate by 1 to 20%, preferably 5 to 15%.

The ultrafine fibers which are used in the present invention can be produced by various processes such as the following:

(a) A process described in Japanese Patent Laid Open No. 119826/1971, wherein a fiber forming polymer is wet-spun from a spinneret made of a metal fiber sheet sintered plate having a filtering precision of less than 15 microns;

(b) A process wherein a spinning solution of a viscosity of 30 to 200 poises is wet-spun from a spinneret having an orifice diameter of 10 to 50 microns.

(c) A process as described in Japanese Patent Publication No. 7411/1968, wherein the sheath components of multicore compound fibers formed of two kinds of polymers which differ in their solubility characteristics are dissolved and removed;

(d) A process such as described in Japanese Patent Publication No. 2791/1965, wherein one of the polymer components of mixed spun fibers formed of two kinds of polymers which differ in their solubility characteristics is dissolved and removed;

(e) A process such as described in Japanese Patent Publication No. 28005/1963, wherein easily separable composite fibers formed from two kinds of polymers which are not very compatible with each other are divided by mechanical action and/or by action of a swelling agent.

The ultrafine fibers which are used to form the present suede-like material, can be made from the same substances which are used to form the fibers of the base cloth.

Suitable materials from which the elastic polymer component of the suede-like material of the present invention can be formed include such known elastic polymers as polyurethane, acryl rubber, nitrile rubber, butadiene rubber, and chloroprene rubber and their derivatives.

In the method of the present invention a layer composite of a base cloth and a ultrafine fiber web is partially formed. The method by which the composite layer is formed is somewhat different than the case when the ultrafine fibers are already less than 0.5 denier per filament and the case when the fibers are not yet ultrafine in this stage. That is to say, in the case where the ultrafine fibers are less than 0.5 denier per filament, it is difficult to form a conventional web with a card machine or the like so that a special contrivance is necessary to form a web. However, suitable webs can be formed by such methods as, for example, a method in which the ultrafine fibers are cut into 1 to 5 mm lengths and, as required, beaten so that a water dispersion of the fibers can be prepared and the water dispersion is poured over a base cloth; a method wherein a web sheet of ultrafine fibers obtained by pouring a fiber suspension over a base cloth is placed on a base cloth; a method wherein ultrafine fibers are cut and, as required, beaten and then a dry web is formed of the fibers on a base cloth with an air flow; a method wherein spun elongated undried tows are expanded with a flow of water to form a web on a base cloth; and a method wherein dry tows or filaments are expanded with air jets to form a web on a base cloth. In the case where the fibers are not yet ultrafine, not only can such methods as described above be used for the fabrication of composite layers, but also a method wherein a dry web is formed with a card machine and the resulting dry web is laid upon a base cloth.

In the instances where a web is formed of ultrafine short fibers and its structure is stablized by temporary bonds applied in advance, which can easily be released by a subsequent treatment with a liquid, the characteristics of the ultrafine short fibers, for example, the fineness, fiber length, polymer composition and the web weight will be easily varied. In particular, the weight of the web can be easily varied by only changing the number of layered sheets of the ultrafine short fibers web itself. In this case, if the temporary bond is released and an integrating treatment is accomplished whenever each sheet is laid, the entangling effect will be enhanced and specks will be reduced. It is very easy to select the base cloth upon which the sheets are to be laid. Further, if a temporarily bonded ultrafine short fiber web is used, a multilayer composite which is very voluminous when formed by such a direct laying method as is described above can be used to much industrial advantage.

In such a case, the ultrafine short fiber web can be made by either a dry method or a wet method. However, the wet method is more advantageous technically and more preferable with respect to uniformity of the quality of the web. Further, when temporarily bonding the very fine short fibers, usually a binder, preferably starch or a water-soluble polymer such as polyvinyl alcohol or polyacrylic acid alone or a binder consisting of a combination of these materials is used. However, when the ultrafine short fibers are so fine so that they possess self-bondability, no binder need by present. For example, in the case of undried very fine fibers of an acrylonitrile material obtained by the method described in Japanese Patent Laid Open No. 119826/1976, in which the fibers are properly pressed after being formed into sheets, self-bonding will be achieved. Further, in the case of undried regenerated very fine short fibers prepared by a viscose method, even if the fibers are not pressed after being sheeted, the fibers will self-bond thereby resulting in a web of considerable strength.

The above mentioned temporarily bonded fibers will be released when a binder is used by treating the fibers with a solvent for the binder. Moreover, in the case of the self-bonding binded fiber, the fibers can be released by treating them with water. The method of feeding the treating liquid not only includes spraying methods, but also any other method which will not disturb the ultrafine short fiber web. It is desirable for the uniformity of the obtained sheet to remove the treating liquid by suction or the like before the subsequent integrating treatment. It is especially effective to treat the fibers with a surface active agent in order to elevate the water dispersibility of the obtained sheet. The composite layer obtained is then integrated by impinging fine liquid streams under high pressure onto the ultrafine fiber web surface. A preferred method of the integrating treatment in such cases involves placing a composite layer on a substantially flat and smooth surfaced support and then impinging liquid streams, preferably water streams under a pressure of 5 to 100 kg/cm$^2$(guage), preferably 5 to 35 kg/cm$^2$ (guage) onto the above mentioned ultrafine fiber web surface through a nozzle of many orifices wherein each orifice has a diameter of 0.06 to 1.5 mm, preferably 0.1 to 0.3 mm and set in a position 1 to 15 cm above the composite layer. The support having a flat and smooth surface may be anything which will not yield a pattern on the sheet and the liquid jets can be quickly removed. However, a net-shaped object of more than 40 mesh per inch or a roll of a diameter of more than 30 mm is preferably used.

By such a liquid jetting treatment, the individual ultrafine fibers will substantially entangle with each other, a portion of the ultrafine fibers will be stuffed into the gaps in the base cloth, which are mostly knitting meshes or weaving meshes when the base cloth is a knitted fabric or woven fabric, and at least a portion of the ultrafine fibers will be entangled with the component fibers of the base cloth so that the base cloth and the ultrafine fibers may be substantially integrated with each other. In such cases, if a cloth of comparatively high apparent density and great weight is used for the base cloth, the ultrafine fibers which are stuffed into the gaps of the base cloth will not substantially reach the other surface of the base cloth and therefore the obtained sheet will have the ultrafine fibers on only one surface. On the other hand, if a cloth of comparatively low apparent density and low weight is used for the base cloth, the ultrafine fibers which are stuffed into the gaps of the base cloth will almost all reach the other surface of the base cloth and therefore the obtained sheet will have the ultrafine fibers present on both surfaces. The composite layer, thus made is substantially integrated, is shrunk, as required, impregnated with an elastic polymer and buffed. The easily separable compound fibers can be partially divided in the above mentioned integrating treatment. However, a method can be adopted wherein one of the components is treated with a swelling agent or a solvent combination of a good solvent and a poor solvent, or the fibers can be mechanically divided into very fine fibers at the time of the buffing treatment. For example, in the case of compound fibers of polyester and nylon, if the fibers are treated with a dilute aqueous solution of caustic soda or with benzyl alcohol, the fibers will easily divide into individual polymers of ultrafine fibers.

When the sheet is impregnated with the elastic polymer latex, the latex can be applied by a known method such as by using a solvent solution of the latex to wet-coagulate the sheet, or by a method wherein the sheet is treated with an aqueous emulsion and then is dried, or by a method wherein the sheet is heat-treated by using a water-soluble elastic polymer. Further, in the treatment a known technique can be applied wherein the sheet is dipped in such a solution or a method can be applied wherein the sheet is coated on the back surface by a roller.

Buffing of the sheet can be accomplished by any conventional technique. There is no particularly critical method. However, even if the sheet is not particularly buffed, by varying the length of the cut ultrafine fibers, it will be possible to obtain a sheet of sufficient suede-like appearance and touch.

The present invention is industrially quite significant in that the sheet material of the present invention has excellent performance characteristics not found in a conventional artificial suede material and has an appearance, touch and physical performance very close to those of a natural suede as detailed above.

Having generally described the invention, a more complete understanding can be obtained by reference to certain specific examples, which are included for purposes of illustration only and are not intended to be limiting unless otherwise specified.

EXAMPLE 1

A copolymer having an intrinsic viscosity of 1.7 (as measured in dimethylformamide at 25° C.) and of 91% by weight acrylonitrile and 9% by weight methyl acrylate was dissolved in dimethylformamide to prepare a spinning solution with a polymer concentration of 18%. This solution was spun into a coagulating bath containing 60% by weight dimethylformamide and 40% water at 30° C. through the spinneret of Pole Filter Ridge Mesh Sheets (produced by Pole Trinity Micro Company) having a filtering precision of 5 microns. The resultant filament was drawn in boiling water to a length three times as long as its original length to a tow of 4,500 deniers consisting of ultrafine fibers of an average single fiber fineness of 0.1 denier. The tow was cut into lengths 3 mm long, was beaten, was then dispersed in water and was formed into sheets in an ordinary manner thereby forming a web of a weight of 30 g/m². This undried web was laid on a knitted fabric of a weight of 60 g/m² which was formed of acrylic filament. Yarns of 180 d/60f were composed of a copolymer of acrylonitrile-methyl acrylate in a ratio of 91/9 by weight. This composite layer was placed on a metal screen support of 200 mesh and passed under streams of water ejected under a pressure of 20 kg/cm² (gauge) against the fiber web surface through a jetting nozzle having an orifice diameter of 0.15 mm and an orifice distance of 1.0 mm to integrate the fibers. The distance between the jetting nozzle and the web was 4 cm and this treatment was repeated three times. Then the sheet was dried and was shrunk by 20% with saturated steam at a pressure of 1.0 kg/cm² (guage) whereby a sheet having the following physical properties and having an excellent drape and a touch as excellent as of a natural suede was obtained.

Thickness: 0.50 mm
Weight: 140 g/m²
Cantilever bending length: 23 mm
Strength: 170 kg.cm//g/cm²
Knitting/very fine fiter group: 2/1 by weight

EXAMPLE 2

A sheet as obtained in Example 1 was impregnated with an aqueous solution of a polyurethane emulsion so as to deposit a 15% polyurethane solution on the weight of the above mentioned sheet and was dried. The obtained sheet had the following physical properties and was very close in nature to natural suede.

Thickness: 0.57 mm
Weight: 161 g/m²
Cantilever bending length: 29 mm
Strength: 180 kg/cm//g/cm²

EXAMPLE 3

A knitted fabric of a weight of 51 g/m³ was made from polyester filaments yarn of 75 d/36 f and having a latent shrinkage of 30%. The ultrafine short fiber web obtained in Example 1 was laid upon this knitted fabric to make a composite layer. Water streams were impinged onto the composite layer under the conditions shown in Example 1 except that the jetting pressure on the ultrafine short fiber web side was 30 g/cm² (guage). Then, the sheet was overlaid with one more web of ultrafine short fibers, was treated again with the water jet streams, was shrunk by 28% in boiling water, was treated with an aqueous solution of a polyurethane emulsion thereby depositing 10% by weight polyurethane on the weight of the sheet and was dried. The sheet thus obtained had the following physical properties, was completely covered on both surfaces with the ultrafine short fibers, had a strong soft touch and had an appearance and hand-like texture of a natural suede.

Thickness: 0.67 mm
Weight: 231 g/m²
Strength: 195 kg/cm//g/cm²
Catilever bending length: 31 mm
Knitting/very fine short fiber group: 5/6 by weight

EXAMPLE 4

A web of a weight of 90 g/m² was prepared by a conventional random web laying technique from compound fibers having a quadrisectional cross section of 1.0 denier and consisting of 50 parts of nylon 6 and 50 parts of polyethylene terephthalate and divisible equally into four parts. The web was laminated on the same knitted fabric of high shrinkage polyester as was used in Example 3 and the laminate was lightly needle-punched against the web side so that the needle density was 5 needles/cm² and was further placed on a metal screen of 80 mesh and passed under a water jet stream under a pressure of 35 kg/cm² (gauge) by using the same jetting nozzle as was used in Example 1. After the laminate was shrunk by about 28% in boiling water and was further treated with an aqueous solution of 30 g/l of NaOH at 70° C., the compound fibers were divided into four parts each of which had an ultrafine denier. The obtained sheet had the following physical properties and had a natural suede-like hand and excellent performance characteristics.

Thickness: 0.7 mm
Weight: 260 g/m²
Strength: 204 kg/cm//g/cm²
Catilever bending length: 29 mm
Knitting/very fine short fiber group: 11/9 by weight

EXAMPLE 5

The sheet obtained in Example 4 was coated with a dimethylformamide solution of a polyurethane, was coagulated in an aqueous solution of 40% dimethylformamide and was then washed with water and dried. 7% Polyurethane based on the weight of the sheet was deposited and the physical properties of the resulting sheet were as follows:

Thickness: 0.71 mm
Weight: 279 g/m²
Strength: 230 kg/cm//g/cm²
Cantilever bending length: 32 mm

EXAMPLE 6

A polymer which had an intrinsic viscosity of 1.6 as measured in dimethylformamide at 25° C. and composed of 93.5% by weight acrylonitrile, 6% by weight vinylacetate and 5% by weight sodium methacrylsulfonate was dissolved in dimethylacetamide to prepare a 17% spinning solution. This spinning solution was spun into a coagulating bath containing 60% dimethylacetamide and 40% water at 30° C. through a nozzle having 40,000 orifices wherein each orifice diameter was 0.03 mm, was drawn to a length four times as long as its original length in boiling water, was dried, was then further drawn to a length 1.5 times as long as its previous length with dry heat at 170° C. and then was allowed to relax in saturated steam under 2.0 kg/cm² pressure (gauge). The ultrafine fiber tow thus obtained (of a single fiber fineness of 0.12 denier) was cut to lengths of 3 mm and was placed into water to prepare a dispersion of a fiber concentration of 0.01% by weight. On the other hand, a light weight knitted fabric was prepared from nylon textured yarns of 75d/36f. The ultrafine fiber dispersion was directly applied onto the knitted fabric to form a composite layer of a wet laid ultrafine fibrous sheet and knitted fabric so that the ratio of the knitted fabric/ultrafine fiber layer was 4/6 by weight. The composite layer was treated with a water jet stream under the same conditions as described in Example 3. When the composite layer was impregnated with a polyurethane emulsion so that the polyurethane constituted 20% weight of the quantity of the dry composite layer and was dried, a sheet having the following physical properties was obtained wherein both surfaces of the knitted fabric were completely covered with the ultrafine fibers and had a natural suede-like hand:
Thickness: b 0.62 mm
Weight: 203 g/m²
Strength: 270 kg/cm//g/cm²
Cantilever bending strength: 33 mm

EXAMPLE 7

A viscose having a salt point of 8 and consisting of 7% by weight cellulose and 4% alkali was spun into a spinning bath at 40° C. which contained 100 g/l of sulfuric acid, 350 g/l of sodium sulfate and 12 g/l of zinc sulfate with the same spinneret that was used in Example 1. The resulting filament was then drawn to a length 1.5 times as long as its original length in a drawing bath of 5 g/l of sulfuric acid at a temperature of 60° C. and was cut to pieces of a length of 4 mm each. The pieces were desulfurized, water-washed and dried. The single fiber fineness of the obtained fibers was 0.08 denier. The dried short fibers were dispersed in air with air streams and were spread on a separately prepared knitted fabric of a weight of 80 g/m² and consisting of polyethylene terephthalate filament yearns (75 d/36f) having a latent shrinkage of 40%. The weight ratio of the knitted fabric to the ultrafine short fibers in the composite layer was 1:1. The above mentioned composite layer was treated with a water jet stream under the same conditions as described in Example 1, was shrunk by a factor 33% in warm water at 70° C. and was somewhat spontaneously elongated in boiling water. The thus obtained sheet had an appearance like a natural suede, covered on both surfaces with ultrafine short fibers. When the sheet was subsequently impregnated with 10% by weight acrylic elastomer based on the weight of the sheet and was buffed the following physical property values were obtained.
Thickness: 0.70 mm
Weight: 350 g/m²
Strength: 281 kg/cm//g/cm²
Cantilever bending length: 29 mm

EXAMPLE 8

A polyethylene terephthalate of an intrinsic viscosity of 0.64 in orthochlorophenol at 30° C. was melt-spun in the usual manner whereby an undrawn yarn of a single fiber fineness of 3 deniers and a total fineness of 600 deniers was obtained. The undrawn yarn was drawn to a length 8 times as long as the original length in a warm water bath at 80° C. and was then drawn again to a length twice as long as its previous length between a roller at 80° C. and a roller at room temperature. Thereafter, the yarn was thermoset at a fixed length at 120° C., was cut into pieces each of a length of 3 mm and was then dispersed in water to prepare a dispersion of fibers at a concentration of 0.007%.

On the other hand, the same polyethylene terephthalate polymer was spun at 1800 m/min. and was then drawn to a length twice as long as the original length between a feed roll at 80° C. and a drawn roll at room temperature whereby highly shrinkable filamentary yarns of 75d/36f having a shrinkage of 60% when treated with warm water at 70° C. and a latent spontaneous elongatability of 12% when subsequently treated with boiling water was obtained. A knitted fabric was prepared from these yarns and was directly deposited on a web from a dispersion.

When the thus obtained composite layer was treated with the same water jet stream as employed in Example 1 and was then treated for 5 minutes with water at 70° C., the resulting sheet substantially shrank and a considerably hard sheet in terms of hand was obtained. When this sheet was treated for 30 minutes in boiling water, was dried and set by ironing at 140° C., a very soft sheet was obtained, which possessed a natural suede-like appearance and exhibited the preferred handling, softness and touch characteristics like those of natural leather.

EXAMPLE 9

A polyethylene terephthalate having an intrinsic viscosity of 0.65 in orthochlorophenol at 30° C. and nylon 6 of an intrinsic viscosity of 1.21 in metacresol at 30° C. were separately melted at 280° C. and 270° C. respectively. The melts were spun and subsequently drawn to form a multicore-compound fiber consisting of 13 polyethylene terephthalate core portions and a sheath portion of nylon 6. When the resulting fiber was cut to pieces each of a length of 2 mm and the fiber pieces were treated with formic acid to dissolve the nylon 6 from the fiber pieces, very fine short fibers of polyethylene terephthalate of a fineness of 0.12 denier and a length of 2 mm were obtained. The ultrafine short fibers were dispersed in water thereby forming a dispersion of the ultrafine short fibers in a concentration of 0.008%.

On the other hand, highly shrinkable polyester fibers having a latent spontaneous elongatability as prepared in Example 8 were collected and bundled in the form of tows of 50,000 deniers. The tows were then crimped in an ordinary manner and were cut to staples of a fineness of 2.1 deniers and a length of 50 mm. A needle-punched nonwoven fabric was formed of the staples in an ordinary manner. The nonwoven fabric had a weight of 82 g/m² and an apparent density of 0.15 g/cm³. The above mentioned ultrafine short fiber dispersion was scooped up with the nonwoven fabric to form a composite layer. The composite layer was then treated with a liquid jet. The liquid employed was an aqueous solution containing 200 ppm. of polyethylene oxide. The liquid was expelled as a jet stream under a pressure of 30 kg/cm² (gauge) form a nozzle having orifices of a diameter of 0.25 mm and a distance between orifices of 2.0 mm. The distance between the nozzle and the web was 5 cm and the metal, a screen of 150 mesh which supported the composite layer was moved at a velocity of 8 m/min.

When the obtained sheet was treated for 15 minutes with warm water at 70° C., the sheet shrank to such an extent that it was hard in the hand. When this sheet was treated for 30 minutes in boiling water, dried and thermoset at 140° C., a very soft sheet was obtained, which had such a soft touch on its surface that it seemed like a natural suede.

EXAMPLE 10

Composite fibers spun from a mixture of melts of 40 parts of nylon 6 and 60 parts of polystyrene were cut to pieces of a length of 2 mm and were treated with toluene to dissolve the polystyrene from the ultrafine short fibers of nylon 6 of an average single fiber fineness of 0.02 denier. The ultrafine short fibers were dispersed in water to prepare an aqueous slurry containing 0.005% by weight of the ultrafine short fibers. A wet laid web having a weight of 62 g/m² was formed from this slurry on a metal screen to obtain a web having a weight of 62 g/m².

A light weight knitted fabric which was made of nylon textured yarns of 75 d/36f, was used covered with the above mentioned web to produce a composite layer and then this composite layer was treated with a water jet stream. In the water jet stream treatment, streams were expelled from a nozzle under a pressure of 30 kg/cm² (gauge) wherein the nozzle had orifices each of a diameter of 0.20 mm and an orifice distance of 1.5 mm. The distance between the nozzle and the web was 3 cm. The metal screen of 150 mesh which supported the composite layer was moved at a velocity of 3 m/min.

When the liquid was expelled as a jet stream twice in both the longitudinal direction and lateral direction of the composite layer and the composite layer was dried, the base cloth had very fine short fibers present on both surfaces and had a natural suede-like touch on both surfaces.

EXAMPLE 11

Easily divisible compound fibers having quadrisectional cross-sections and consisting of 50 parts of nylon 6 and 50 parts of polyethylene terephthalate were spun and were then drawn by a factor of 2.2 times as long as the original length thereby producing fibers of a fineness of 1.2 denier per filament. When the compound fibers were cut into pieces each 3 mm long and were treated for 30 minutes with benzyl alcohol at 80° C., the boundary surfaces of the nylon 6 and polyethylene terephthalate had almost all peeled from the fibers thereby producing ultrafine short fibers of 0.3 denier. The ultrafine fibers were washed with methanol, then with water and were finally dispersed in water to prepare a fiber slurry of 0.01% by weight. By scooping up the slurry with a metal screen, a wet-laid web was obtained. The web was subsequently placed on a needle-punched nonwoven fabric made of highly shrinkable polyester fibers having a latent spontaneous elongatability as prepared in Example 9. The fibers were treated with the same liquid jet as employed in Example 9 and was after-treated with heat to yield a sheet of soft hand and touch like a natural suede.

EXAMPLE 12

An acrylonitrile copolymer containing 92% by weight acrylonitrile and 7% by weight vinyl acetate and having an instrinsic viscosity of 1.7 as measured in dimethylformamide was dissolved in dimethylacetamide to prepare a solution containing a polymer concentration of 16% by weight. This solution was wet spun into a coagulating bath containing 60% dimethylacetamide and 40% water at 35° C. through a spinneret made by overlapping two filters of Pole Filter Ridge Mesh Sheets (produced by Pole Trinity Micro Company) which had a filtering precision of 5 microns. The filters were made of sintered stainless steel fibers which were folded and woven. the coagulated fibers were taken up at a velocity of 5 m/min. then drawn to a length three times as long as the original length in boiling water to produce an ultrafine fiber tow of an average single fiber fineness of 0.1 denier and a total fineness of 4,2000 deniers. The tow was cut into pieces each 3 mm long. The pieces were placed in water to prepare a dispersion having a fiber concentration of 0.01% by weight.

On the other hand, a knitted fabric of a weight of 120 g/m² was made from textured yarns of acrylic fiber filaments of 180 d/60 f. The above mentioned ultrafine dispersion was scooped up with the knitted fabric whereby a composite layer was formed which was composed of a layer of the web of the ultrafine short acrylic fibers and the knitted fabric of acrylic textured yarn. The composite layer was placed on a metal screen of 200 mesh and was treated with a water jet stream on the ultrafine short acryl fiber web side. In the water jet stream treatment, water jet streams were expelled from a nozzle under a pressure of 25 kg/cm² (gauge) wherein the nozzle had orifices each of a diameter of 0.15 mm and an orifice distance of 1 mm. The distance between the nozzle and the web was 4 cm and the metal screen supporting the composite layer was moved at a velocity of 5 m/min. Then the composite layer was passed onto a metal roll of a diameter of 20 cm. was treated with water jet streams from the same nozzle under a pressure of 30 kg/cm² (gauge) from a height of 4 cm above the composite. The resulting composite was dried whereby a sheet of a weight of 172 g/m² was obtained. The product sheet had a structure of an ultrafine short fiber web of 52 g/m² which was integrated with the knitted fabric. The obtained sheet was covered on the surface with ultrafine short fibers, and therefore was very soft and had an appearance and hand like that of a natural suede.

EXAMPLE 13

A spinning solution of 18% by weight was prepared by dissolving a copolymer having an intrinsic viscosity of 1.7 and consisting of 91.8% by weight acrylonitrile, 8% by weight methyl acrylate and 0.2% by weight sodium vinylbenzenesulfonate in dimethylacetamide. The copolymer was spun and drawn in an ordinary manner by using a nozzle having 20,000 orifices each of a diameter of 0.03 mm, whereby a ultrafine fiber tow of a single fiber fineness of 0.11 denier having a dry strength of 3.2 g/d and a dry elongation of 15% was obtained. The tow was cut into pieces 5 mm long. The pieces were beaten with a conventional beater and divided into individual fibers to prepare an aqueous dispersion having a fiber concentration of 0.07% by weight. On the other hand, a plain woven fabric of a weight of 60 g/m² was made of polyester filaments which had a boiling water shrinkage factor of 41% and a fineness of 85 d/36 f and was used as the base cloth.

The above mentioned fabric was placed on a support consisting of a metal screen of 80 mesh which ran at a velocity of 5 m/min. and the above mentioned aqueous dispersion of ultrafine fibers was allowed to uniformly flow and expand on the fabric to form a web having a weight of 40 g/m². Water jet streams were expelled onto the web surface three times under pressures of 15, 35 and 35 kg/cm², respectively, through a nozzle having orifices of a diameter of 0.15 mm and an orifice distance of 1.0 mm. The aqueous dispersion of ultrafine fibers was again allowed to flow and expand on the obtained sheet to form a web of a weight of 30 g/m². Water jet streams were expelled onto the web again three times under pressures of 15, 50 and 50 kg/cm² respectively, through the same nozzle. Then the sheet was shrunk in hot water at 98° C., was dried and thermoset at 160° C. in a tenter dryer. The sheet was then dryed, buffed and finished in a conventional manner whereby a suede-like sheet was formed wherein the fabric and ultrafine fibers were fully integrated with each other. The product sheet was covered completely with ultrafine fibers on both surfaces of the fabric and the product had a very soft touch and excellent drape characteristics.

EXAMPLE 14

When the sheet obtained in Example 13 which had not yet been buffed was impregnated with 5% polyurethane latex in an ordinary manner and then buffed, a sheet having the softness, appearance and preferred hand of a natural suede was obtained.

EXAMPLE 15

A soft web of a weight of 70 g/m² of compound fibers having a cross-section divisible equally into 3 parts and consisting of polyethylene terephthalate and nylon 6 at a weight ratio of 50:50 was laid on the same base cloth which was used in Example 13 to form a composite layer. The composite layer was lightly needle-punched, was then placed on a support made of a twill of 60 mesh nylon monofilament and was run at a velocity of 8 m/min. A surface of the composite layer was then subjected to a jet stream in two stages under pressures respectively of 30 and 50 kg/cm² through a nozzle having orifices each of a diameter of 0.15 mm, and an orifice distance of 1.0 mm. The layer was then dipped into hot water containing 10 g/l of NaOH and was thereby shrunk. At the same time, the layer of the composite was divided into compound fibers and the resulting material was washed with water and was then dried and thermoset at 150° C. whereby a suede-like sheet material which was covered on one surface with ultrafine fibers and had favorable drape characteristics was obtained.

EXAMPLE 16

When the sheet obtained in Example 15 was impregnated with 10% polyurethane in an ordinary manner and was napped, a sheet having a softness, appearance and hand close to a natural suede was obtained.

EXAMPLE 17

The ultrafine fiber tow obtained in Example 13 was cut into 3 mm pieces and the cut pieces were beaten. A water dispersion of ultrafine fibers of 0.05% concentration containing 0.004% of a water-soluble polymer consisting of acrylamide and acrylic acid in a weight ratio of 95:5 was prepared. The aqueous dispersion was wet-laid and dried in an ordinary manner to form a temporarily bonded ultrafine fiber web of a weight of 30 g/m².

The obtained web was laid on a tricot knitted fabric having a weight of 62 g/m² and formed of polyester filament yarns having a boiling water shrinkage factor of 50% and a fineness of 150 d/50 f. The composite layer was placed on a plain woven nylon net of 80 mesh per inch and was treated on the web surface with water stream jets in three stages under pressures respectively of 15, 35 and 35 kg/cm² through a nozzle having orifices of a diameter of 0.15 mm and an orifice distance of 1.0 mm. In this case, the above mentioned temporary bond of the ultrafine fiber web was released by the water jet stream treatment under a pressure of 15 kg/cm² in the first stage. A very ultrafine web was laid on the obtained sheet and was treated with the water jet stream under the same conditions as described above. Then the sheet was shrunk in boiling water, was dried and heat-treated at 170° C. Thereafter, the composite was dyed and buffed whereby a suede-like sheet covered completely with ultrafine fibers on both surfaces of the sheet was obtained.

EXAMPLE 18

Ultrafine acrylic fibers (of a weight ratio of acrylonitrile/methyl methacrylate of 90/10) were spun by using a spinneret having a filtering precision of 5 microns and the fibers were formed into sintered sheets which were then cut into pieces 3 mm long. The cut pieces were beaten to prepare a water dispersion of a fiber concentration of 0.01%. The water dispersion was wet-laid in an ordinary manner. The sheet was pressed at room temperature under a pressure of 15 kg/cm² on a net conveyer and was roller-dried to form a self-bonded paper-like web of a weight of 40 g/m².

The obtained web was laid on a twill of a weight of 60 g/m² of polyester filament yarns having a boiling water shrinkage factor of 50% and a fineness of 150 d/50 f. The composite layer was placed on a 60 mesh metal screen and the composite layer was wet with shower water to weaken the self bonded fiber. The layer was then treated with water jet streams in two stages under pressures respectively of 10 and 30 kg/cm² through the same nozzle used in Example 17. The sheet obtained having one more of the above mentioned webs laid upon it was treated with the same water jet stream as described above. The composite layer was then treated with a water jet stream under 30 kg/cm² pressure on a metal roll of a diameter of 20 cm once on each of the front and back surfaces of the sheet. Then the sheet was shrunk in boiling water, was dried and heat-treated at 150° C. in a tenter dryer. Thereafter, the sheet was dyed whereby a suede-like sheet covered on both surfaces with the ultrafine fibers was obtained.

Having now fully described the invention, it will be apparent to one of ordinary skill in the art that many changes and modifications can be made thereto without departing from the spirit or scope of the invention as set forth herein.

What is claimed as new and intended to be secured by Letters Patent is:

1. A suede-like sheet material produced by a process, comprising:
    forming a composite layer material by depositing a web consisting of ultrafine fibers of less than 0.5 denier per filament on a base cloth of a knitted fabric or a woven fabric; and
    expelling a fine liquid stream jet under high pressure onto the surface of the ultrafine fiber web thereby substantially integrating ultrafine fibers with the base cloth.

2. The suede-like sheet material of claim 1, wherein the pressure of said fine liquid stream jet is 5 to 100 kg/cm².

3. The suede-like sheet material of claim 1, wherein the length of said ultrafine fibers is 1 to 5 mm.

4. The suede-like sheet material of claim 1, wherein the thickness of said sheet material ranges from 0.4 to 1.0 mm.

5. The suede-like sheet material of claim 1, wherein said base cloth is formed of fibers having a latent shrinkage of more than 10%.

6. A suede-like sheet material produced by a process, comprising: forming a composite layer material by depositing a web consisting of ultrafine fibers of less than 0.5 denier per filament on a base cloth of a knitted fabric or a woven fabric; expelling a fine liquid stream jet under high pressure onto the surface of the ultrafine fiber web thereby substantially integrating ultrafine fibers with the base cloth; and then impregnating the sheet with an elastic polymer in an amount less than 50% based on the total weight of the base cloth and ultrafine fibers.

7. The suede-like sheet material of claim 6, wherein the pressure of the fine liquid stream jet is 5 to 1000 kg/cm$^2$.

8. The suede-like sheet material of claim 6, wherein the length of said ultrafine fibers is 1 to 5 mm.

9. The suede-like sheet material of claim 6, wherein the thickness of said sheet material ranges from 0.4 to 1.0 mm.

10. The suede-like sheet material of claim 6, wherein said base cloth is formed of fibers having a latent shrinkage of more than 10%.

11. A suede-like sheet material having a thickness and specific volume respectively of 0.4 to 1.0 mm and 2.0 to 3.5 cm$^2$/g respectively, comprising: forming a composite layer material by depositing a web consisting of ultrafine fibers of less than 0.5 denier per filament on a base cloth of a knitted fabric or a woven fabric; and expelling a fine liquid stream jet under high pressure onto the surface of the ultrafine fiber web thereby substantially integrating ultrafine fibers with the base cloth.

12. A suede-like sheet material having a thickness and specific volume of 0.4 to 1.0 mm and 2.0 to 3.5 cm$^2$/g respectively, comprising: forming a composite layer material by depositing a web consisting of ultrafine fibers of less than 0.5 denier per filament on a base cloth of a knitted fabric or a woven fabric; expelling a fine liquid stream jet under high pressure onto the surface of the ultrafine fiber web thereby substantially integrating ultrafine fibers with the base cloth; and then impregnating the sheet with an elastic polymer in an amount less than 50% based on the total weight of the base cloth and ultrafine fibers.

* * * * *